UNITED STATES PATENT OFFICE.

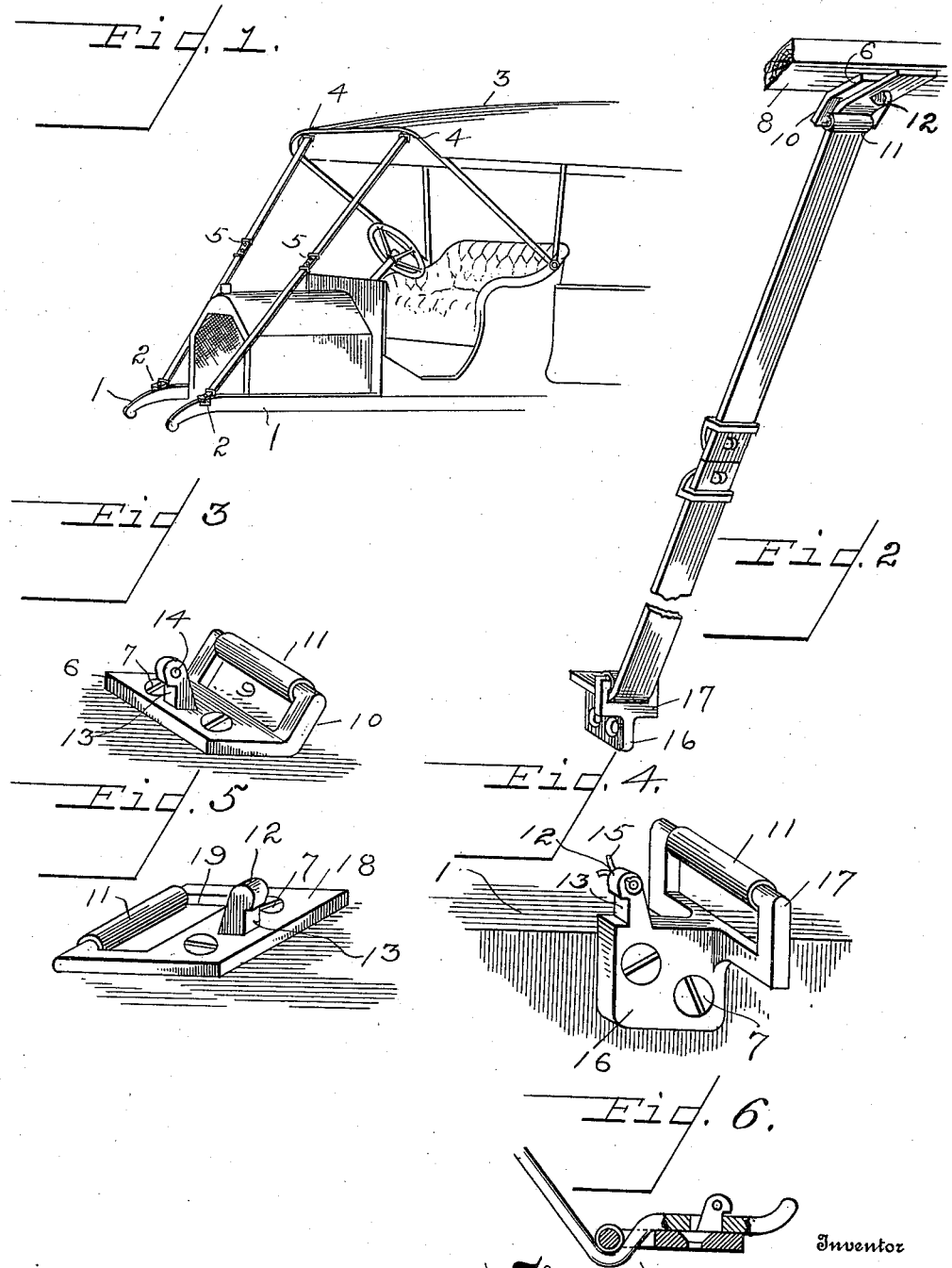

HELEN M. ORMSBY, OF XENIA, OHIO.

GUY FOR VEHICLE-TOPS.

1,028,266.  Specification of Letters Patent.  Patented June 4, 1912.

Application filed January 21, 1910. Serial No. 539,362.

*To all whom it may concern:*

Be it known that I, HELEN M. ORMSBY, a citizen of the United States, residing at Xenia, in the county of Greene and State of Ohio, have invented certain new and useful Improvements in Guys for Vehicle-Tops, of which the following is a specification.

My invention relates to automobiles and particularly to an improved form of guy or stay for preventing undue oscillation or vibration of the vehicle top, and an attaching device for removably engaging the guy strap with the body and top of the vehicle.

The object of the invention is to greatly simplify the construction and mode of attaching such devices whereby they will not only be cheapened in construction but will be rendered more efficient in operation, more easily connected and disconnected, and more secure and unlikely to become accidentally disconnected.

With the above primary and other incidental objects in view as will more fully appear in the specification, the invention consists of the features of construction, the parts and combinations thereof and the mode of operation as hereinafter described and set forth in the claims.

Referring to the drawings Figure 1 is a perspective view of a portion of an automobile embodying the present invention. Fig. 2 is a perspective view of the vehicle-top guy and attachment devices forming the subject matter hereof. Fig. 3 is a perspective view of an attaching device for removably engaging the guy strap with either the top or body of the vehicle, but preferably employed for the attachment to the top. Fig. 4 is a perspective view of the attaching device preferably employed for removably engaging the strap with the body of the vehicle, but which may be used at any point where the surface to which the device is to be applied is perpendicular to the plane of the guy strap. Fig. 5 is a modified form of attachment device suitable for engaging the guy strap with either the top or body portions of the vehicle. Fig. 6 is a sectional detail view of the type of attachment device shown in Fig. 5, illustrating the mode of attaching the guy strap.

Like parts are indicated by similar characters of reference throughout the several views.

I am aware that guy straps extending between the body and top of a vehicle are not new *per se*, but that such devices are extensively used at the present time. However those devices now in use usually consist of a single section either permanently attached to the vehicle body and top, or the mode of attachment is inconvenient and unhandy, and in some cases where it has been sought to overcome these difficulties the attachment means is unreliable.

The guy strap involved in the present invention may be formed in upper and lower sections united by a connecting device as shown in the drawings and hereinafter described, or it may be a single length of strap removably attached to the body and top of the vehicle by the improved attaching devices forming an important feature of the invention.

In the drawings 1—1 are the frame bars of the vehicle to which the lower ends of the guy straps are usually attached, as at the point 2. The upper ends thereof being attached to the vehicle top 3 at the points 4—4. The connecting member is located mid-length of the strap as at 5—5.

The upper attachment device is best shown in Fig. 3 and comprises a base portion 6, provided with screw holes for its attachment by means of screws 7 to the forward rib 8 of the vehicle top as shown in Fig. 2. The member is thereby rigidly and permanently secured to its support. The forward portion of the member is provided with a rectangular slot or aperture 9, the said apertured portion extending in a plane angular with the base 6 as shown at 10. In order to reduce friction and prevent the chafing of the guy strap at the point it passes through the aperture, the extreme portion of the member beyond the aperture is provided with a revoluble tubular inclosure 11 forming an anti-friction roller. Projecting from the base 6 and preferably formed integral therewith is a stud 12, centrally disposed in relation to the aperture 9. The stud 12 is preferably, though not necessarily inclined away from the aperture 9. For the purpose of greater security the stud 12 is provided with a notch or recess 13 on the side opposite the aperture in which the guy strap interengages, as shown in Fig. 7. To meet unusual conditions there is also provided in the stud 12 a transverse opening 14 for the reception of a cotter pin or other retaining pin 15, which will prevent the disengagement of the strap from the stud.

The device shown in Fig. 3 may also be used at the lower extremity of the guy strap, but under ordinary conditions a form of attaching device as shown in Figs. 2 and 4 is preferred. This form of device differs from that of Fig. 3 in that the base portion 16 and the frame or apertured portion 17 both extend in vertical planes at right angles with each other, the apertured portion being offset above the level of the base portion 16. The construction of this device is such as to enable it to be attached to a perpendicular surface, such as the side of the frame bar 1. This device is also provided with the antifriction roller 11, and the stud 12 exactly as described in the former construction. For some unusual construction of vehicle top or other unusual conditions it might be desirable to use this form at the upper end of the guy strap, which may be done without affecting the operation of the device.

In Fig. 5 is shown a modified form of attaching device in which the base portion 18 and the apertured portion 19 or frame extend in a common plane. This device is also provided with the anti-friction roller 11 and the stud 12 as before described.

In attaching the guy strap to the device the end of the strap which is provided with a perforation is passed through the aperture of the member and the perforation is engaged over the stud 12, as clearly shown in Fig. 7. Upon subjecting the strap to strain or stress the portion of strap adjacent to the perforation is caused to seat within the recess 13 of the stud which prevents the accidental disengagement of the parts.

From the above description it will be apparent that there is thus provided a vehicle-top guy possessing the particular features of advantage before enumerated as desirable, but which obviously is susceptible of modification in its form, proportion, detail construction, and arrangement of parts, without departing from the principle involved or sacrificing any of its advantages.

Having thus described my invention I claim;

1. As an article of manufacture, an attachment device for vehicle top guys, comprising a base portion adapted to be secured to the vehicle top or body, an apertured extension carried by said base portion, an integral stud also carried by said base portion and projecting to a point beyond the level of the aperture in said apertured portion, said device being adapted to be attached to its support in a position angular to the general trend of the guy, whereby the guy will be bent abruptly at the point of its engagement with the apertured portion, substantially as specified.

2. As an article of manufacture, an attachment device for vehicle top guys comprising a vertically disposed attachment plate adapted to be secured to the vehicle part, and an apertured frame like portion also vertically disposed but arranged substantially at right angles to said attachment plate to which it is attached, and a stud carried by the attachment plate and adapted to engage the guy after it has been passed through the apertured portion, substantially as specified.

3. As an article of manufacture, an attachment device for vehicle top guys comprising a substantially T shaped member formed of two attached portions, the transverse portion being apertured for the passage of the guy therethrough, the pendant portion being adapted to be attached to the vehicle part, and means carried by the pendant portion for engaging the guy after it has been passed through the apertured portion, substantially as specified.

In testimony whereof, I have hereunto set my hand this 15th day of January, A. D. 1910.

HELEN M. ORMSBY.

Witnesses:
 EZRA M. KUHNS,
 F. L. WALKER.

Copies of this patent may be obtained for five cents each, by addressing the "Commissioner of Patents, Washington, D. C."